United States Patent [19]
Bell et al.

[11] 3,710,314
[45] Jan. 9, 1973

[54] APPARATUS FOR DETECTING DEVIATION IN TIRE PRESSURE

[76] Inventors: Alfred S. Bell, 8375 Elmgrove Drive, Baton Rouge, La. 70807; Fred L. Churchman, 2820 Alaska St., Baton Rouge, La. 70802

[22] Filed: March 12, 1971

[21] Appl. No.: 123,624

[52] U.S. Cl. ............... 340/58, 200/61.25, 200/83
[51] Int. Cl. .............................................. B60c 23/00
[58] Field of Search ....340/58; 200/61.22, 61.25, 83; 73/146.2, 146.4, 146.5

[56] References Cited

UNITED STATES PATENTS

| | | |
|---|---|---|
| 2,846,664 | 8/1958 | Amundsen, Jr. et al. ............... 340/58 |
| 2,205,168 | 6/1940 | Guthrie ................................. 340/58 |
| 2,313,247 | 3/1943 | Krow ..................................... 340/58 |
| 2,958,746 | 11/1960 | Hawkins ............................. 200/61.25 |

*Primary Examiner*—Alvin H. Waring
*Attorney*—Lewis R. Krieg

[57] ABSTRACT

Apparatus for detecting deviation from desired normal tire pressure range and for establishing a signal which can be readily transmitted to a vehicle operator while the vehicle is moving. The detecting apparatus is positioned within the tire space and is attached to the wheel rim. The detector includes one or a pair of variable volume chambers, each chamber having a moveable wall to which is operatively connected a rod element. The chamber has a normal volume position established by a normal difference between tire pressure and atmospheric pressure, and by spring action thereon. Upon a tire pressure deviation from normal, the chamber volume is diminished and the rod element is caused to protrude a short distance through the wheel rim, and in such position gives a visible indicia of deviation and also is adapted to actuate a switch establishing an alarm circuit including means to alert the vehicle operator. Preferred embodiments utilize two chambers to detect pressures below or above desired tire pressure. A special switch for the alarm circuit is disclosed.

5 Claims, 13 Drawing Figures

INVENTORS
ALFRED S. BELL
FRED L. CHURCHMAN
BY Lewis R. King
ATTORNEY

APPARATUS FOR DETECTING DEVIATION IN TIRE PRESSURE

BACKGROUND AND PRIOR ART

It has long been recognized that the safety and economy of motor vehicle transportation would be improved if abnormal tire pressures could be brought to the attention of a vehicle operator when the vehicle is moving. At the present time, passenger cars and commercial trucks and trailers have no such provision. Consequently, when the air pressure in a tire is either abnormally low, or abnormally high, the condition will be undetected until a pressure check is made, or until a failure occurs while the vehicle is moving.

The above described condition is generally hazardous because of the danger of blowouts and resultant accidents when a vehicle is moving. Not only are undetected pressure deviations hazardous, but of course tire blowouts can also cause significant financial loss, especially in the case of large commercial tire sizes.

Numerous attempts have been heretofore made to provide devices for detection of deviations in pressure. These have, in general, been of two types. In one type, a sensor finger is positioned adjacent a tire side wall. When the pressure is subnormal, transverse distortion is expected to cause the side wall to strike the sensor finger and to initiate an alarm mechanism. Actually the transverse deflection or enlargement of tires on loss of pressure is very minute, until tire pressure is dangerously low, so that detectors of this type would require quite precise adjustment which is difficult to achieve and maintain. Quite apart from the matter of reliability and practical operability of such devices, it will be immediately seen that a device of this type would not be capable of detecting tire pressures above normal range.

In the second general variety of prior pressure deviation detector devices, the tire air pressure is used to activate a pressure sensitive system, such as a spring loaded piston. Actuation of such a system causes or permits in turn operation of a signalling device. Illustrative of known apparatus of this type is that described in the Fowler U.S. Pat. No. 2,731,936. On the Fowler apparatus a spring loaded diaphragm is kept contracted when normal pressure prevails. When sub-normal pressure occurs, the diaphragm is distended by the spring and an associated air passage is opened by a valve incorporated in the diaphragm, permitting the air in the tire to cause movement of a piston in a cylinder, which movement initiates an electrical alarm circuit.

The Fowler apparatus does not function to show both higher and lower than normal pressure deviations. Further, the Fowler device relies on a valve to prevent signalling when the tire pressure is at a normal level or above. Hence any valve failure, or dirt in the apparatus causing malfunction of the valve, will result in erroneous signalling.

Generally, prior devices which rely on a direct sensing of the tire pressure have been mounted on the wheel or hub in a fashion which exposes the sensitive parts to exterior damage, vandalism, or the like. Further, some of the prior devices of this type appear to be relatively complex and therefor expensive. In any case, no apparatus has thus far been devised which has found general acceptance, despite a recognized need for an effective pressure deviation detector.

OBJECTS OF THE INVENTION

An object of the present invention is to provide a new and improved apparatus for generating signals of tire pressure deviation. A further object is to provide a pressure deviation detecting apparatus which in use is mounted within the tire space and is thus protected from external hazards. A further object is to provide in combination such detector apparatus in combination with a novel switch means which is actuated by the detector and thereupon initiates a warning signal to the vehicle operator. An additional object is to provide a detector assembly of which embodiments can readily be for low, high, or both low and high pressure deviations. Other objects will appear hereinafter.

SUMMARY OF THE INVENTION

In all forms of the invention, the detector includes a variable volume chamber, having a moveable wall, to which a signal rod means is directly or operatively connected. The rod means extends through the wheel rim from the interior space, and is moveable between a retracted or normal position and a protruded position. The detector assembly is mounted within the tire space and is secured to and supported by the wheel rim. Atmospheric air pressure is provided to one side of the moveable wall and actual tire pressure to the other side thereof. A spring is provided which, in conjunction with the force from the differential pressure from the atmospheric and tire air pressures, distends the chamber to a volume providing positioning of the rod means at the normal position. Upon occurrence of a deviation in tire pressure, the chamber volume is reduced by reason of the corresponding change in differential force applied to the moveable wall. The rod means is then caused to move to its protruded position, and is then in a position to actuate an alarm signal switch.

The protruded or signalling position of the rod means can function whether the vehicle is moving forward or in reverse. The alarm signal switch is desirably closed upon actuation, to activate alarm means adjacent the operators position.

In all forms of the invention, when normal tire pressure is restored after a deviation resulting in the detecting and signalling function as above outlined, the operation is reversed, the rod means being then retracted to the normal non-protruding position.

In certain embodiments the detector assembly is provided with two variable volume chambers, each having the structural and functional characteristics outlined above. One of such chambers is responsive to pressure deviations below the desired tire pressure level or range, and the other chamber is responsive to deviations in tire pressure above the normal desired level.

In one variety of such dual chamber types, the rod means comprises a double rod structure. It includes a hollow pin and a second pin positioned in and slidable in the hollow pin. The hollow pin is slidable within limits in a sleeve element which is secured by air tight sealing means in an aperture or hole in the tire rim. The hollow pin extends into the tire interior and is connected at its inner end to a pressure disc assembly. The pressure disc forms part of a wall of a collapsible chamber, which is spring loaded in a distended condition. Upon contraction or partial collapse of this chamber, under the influence of a pressure differential, the hollow pin is moved to a signalling position, that is, to protrusion beyond the inner surface of the wheel's rim.

The solid pin in this first class of embodiments extends, as mentioned, through the hollow pin to the tire interior. Its interior end is joined to a pressure disc assembly, which is an end wall of a second variable volume chamber maintained normally in a distended position by a spring. An increase in tire pressure above the normal range causes at least partial collapse of said chamber. The solid pin in this instance is projected to its signalling position, moving some distance through the aforementioned hollow pin.

When normal tire pressure is restored, the hollow pin, or the solid pin, as the case may be, is retracted as the spring means, associated with the respective collapsible chamber, restores the chamber to its normal distended position.

In an alternate class of embodiments, two collapsible or variable volume chambers are again provided. Instead of two signalling pins, however, a single solid signalling pin is provided. The variable volume chambers are again positioned within the tire, but instead of a direct connection to a pin, wedges are slidably moved upon change in volume of a chamber. Said wedges operate as cams to cause protrusion of the signalling pin into a signalling position.

The alarm circuit activated by a signalling pin, in each application of the invention, requires a rugged, simple switch to establish the circuit. The switch means must be simple in construction and must be capable of retaining operability despite minor misalignments. A novel switch structure is herein described which meets these requirements. The switch structure includes a switch arm pivotally mounted at a mid-point. One end of the switch arm is enclosed by a ring contact member, the other end projects outwardly beyond the limit of a casing for the switch. A flexibly mounted exterior portion continues from the outer end of the switch arm, and constitutes a striker portion which is contacted by a signalling pin of a detector assembly once in each revolution of the wheel and tire. Such contact establishes the alarm circuit by pivoting the switch arm and causing the interior end of the switch arm to contact the ring contact. The switch arm is normally maintained in the open position by spring means suitably mounted.

FIGURES ILLUSTRATING THE INVENTION

The principles of, and several embodiments of the detectors of the invention, are illustrated by the figures, which include FIG. 1, a schematic drawing showing in simple form the elements of a single variable volume chamber embodiment of the detector of the invention, FIGS. 2 – 5, incl., which illustrate a first specific detector having two variable volume chambers, FIGS. 6 – 10, incl., showing the construction of a second detector having two variable volume chambers, FIGS. 11 – 12, which show a novel switch structure for use in conjunction with the detectors of the invention, and FIG. 13, a schematic diagram illustrating the arrangement of a complete system. By complete system is meant the pressure deviation detectors and switches, and the circuitry for providing a signal of pressure deviation from any tire of an automobile and a trailer attached thereto.

DETAILED DESCRIPTION

Figure 1:
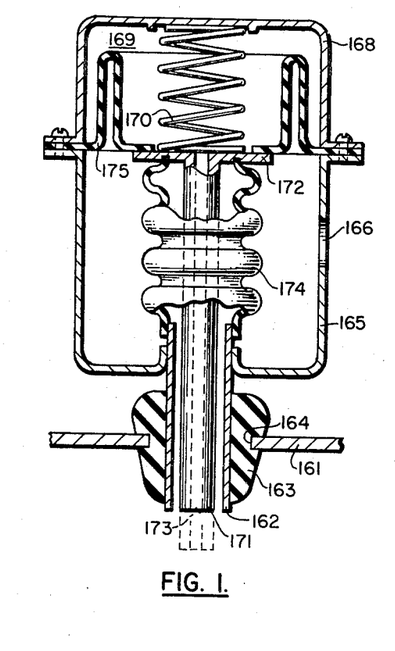

FIG. 1 shows a cross-section of a simple embodiment of the detector, designed for detection and signalling only a downward deviation in pressure from the normal level. The detector is shown positioned or mounted on a wheel rim 161. A sleeve 162, which serves as a supporting standard or upright for the assembly, is surrounded by a grooved rubber bushing 163, which in turn is gripped tightly in a hole 164 in the rim 161.

Attached to an inner portion of the sleeve 162 is a frame 165 in the form of a cup, having at least one aperture 166 in its side wall. The upper rim of the cup is provided with a lip 167, on which is seated a flexible membrane or diaphragm 175. Surmounting the edge of the membrane 175 is a cap 168, having a corresponding rim lip, so that the edge of the membrane can be tightly sealed by clamp means not shown.

Slidably positioned in the sleeve 162 is a hollow rod 171, which projects upwardly to a pressure disc 172, to which it is securely fastened. The bore 173 of the rod 171 continues through the pressure disc 172, so that it is seen that atmospheric air pressure is transmitted to and maintained in the chamber formed by the cap 168, the pressure disc 172, and the flexible membrane or diaphragm 175.

An extensible and contractable bellows 174 encircles the hollow rod 171. It is secured at one end by a gas tight seal to the inner end of the sleeve 162, and at the other end to the hollow rod 171, again by a gas tight connection.

It is readily seen that the space or chamber 169 has a variable volume and a moveable wall comprising in part the pressure disc 172. As already noted, atmospheric air pressure is maintained at all times within the space, and actual tire air pressure is applied against the opposite side of the disc 172 and, of course, the diaphragm 175. A spring 170 is positioned to bear against the pressure disc 172 and is restrained by the cap 168.

The strength and normal elongation of the spring 170 are selected to provide for positioning of the pressure disc (and, consequently, of the hollow rod 171) at the position shown when the actual tire air pressure is at a desired level. The actual spring strength desired can be readily estimated from the principles above defined. For example, assume that the desired air pressure is 30 pounds per square inch, gauge. In a typical embodiment the effective area of the moveable wall, comprising the pressure disc 172 plus the flexible diaphragm 175 would be, illustratively, one-third square inch. Accordingly, the spring 170, when in the compressed position shown, should be under a compressive force of about ten pounds. The foregoing approximation assumes that no appreciable force is applied to the pressure disc 172 by the extensible bellows 174, which would be selected or designed so that, in the position shown, it is at normal elongation and does not exert any spring-like effect on the pressure disc 172.

The functioning of the detector assembly of FIG. 1 in response to a pressure drop in the tire is believed clear.

As the tire air pressure applied to the underside of the pressure disc 172 decreases, then the spring 170 elongates and the hollow rod 171 is caused to protrude to, for example, the extended position indicated by the dashed line outline.

When the detector has responded to a tire pressure loss as described, the protruded rod is in a position to actuate a switch, not shown, and to thereby establish an alarm circuit. Such a switch and its spatial relationship to the detector, and to the vehicle wheel and other parts of a vehicle, will be clear from figures and later description herein.

Figure 2:
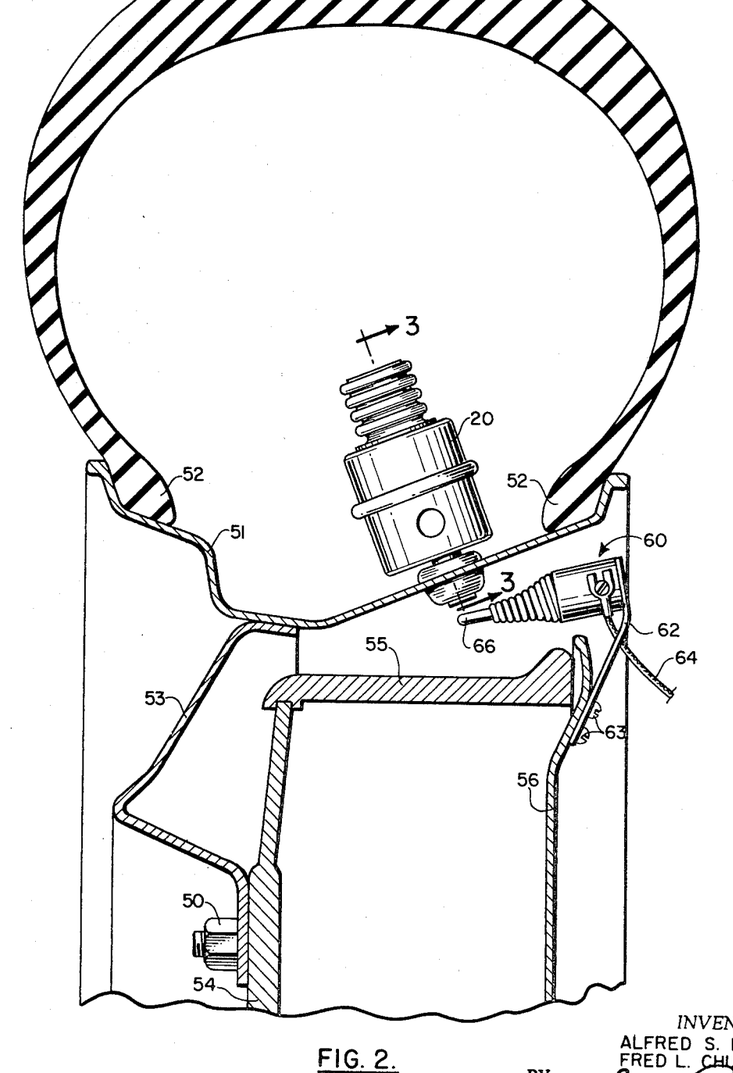
Figure 3:
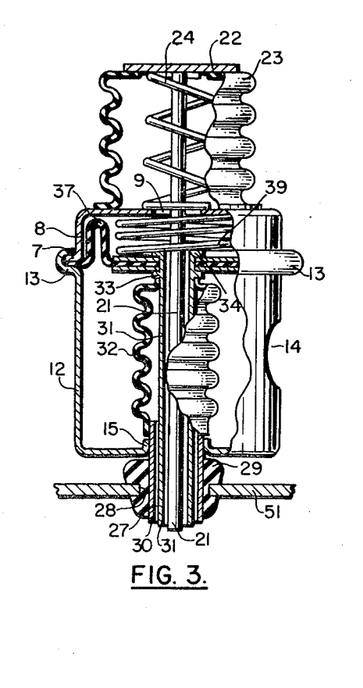
Figure 4:
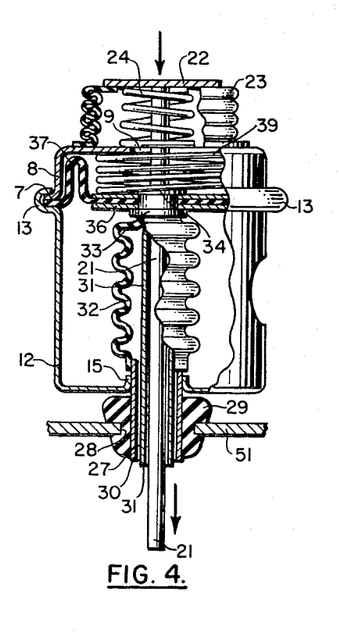
Figure 5:
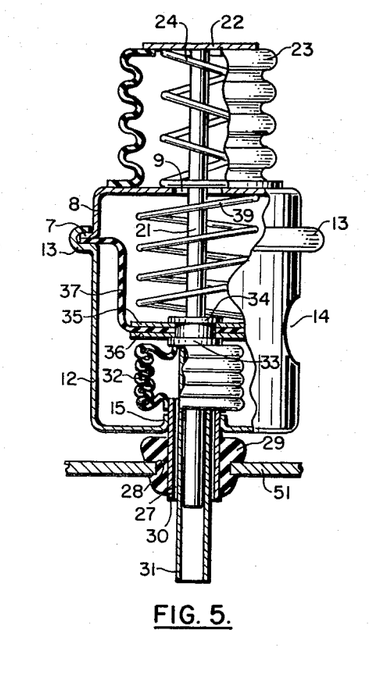

FIGS. 2 – 5, incl., illustrate a more refined embodiment of the detector which employs two variable volume chambers and provides for detecting tire pressure deviation either above or below the desired or normal pressure. In these figures, FIG. 2 is a cross sectional view of a tire and wheel rim showing the mounting of the detector assembly with respect thereto, as well as showing a typical mounting of the switch of the alarm circuit, FIG. 3 is a sectional view on the line 3—3 of the detector assembly shown in FIG. 2, showing the position of the parts thereof when in a normal position, that is, when tire pressure is normal, FIG. 4, is a similar sectional view of the detector assembly of FIG. 2, but showing the posture of the parts thereof in response to a higher than desired tire pressure, and FIG. 5 is a sectional view of the detector assembly, but showing its operation when the detector is responding to a lower than desired tire pressure.

Referring to FIG. 2, a section of part of a vehicle wheel is shown, along with a pressure deviation detector comprising a preferred embodiment of the invention, plus switch means to be actuated by said detector upon its response to high or low pressure tire pressure deviation, as the case may be.

The vehicle wheel includes the conventional rim 51, a portion of the tire 52 mounted thereon being shown in section. The rim 51 is supported in the usual manner by being welded to the wheel center 53, and the entire wheel structure is secured to a hub plate 54 by a series of lug bolts 50. The hub plate supports a cast iron brake drum 55. The brake interior and the brake shoes and other brake mechanism parts, not shown, are separated from the outside environment by a metal backing plate 56, which is a non-rotating plate secured to an axle housing.

The detector assembly 20 is secured by a rubber grommet or bushing 29 in a circular hole 28 in the rim 51, the detector assembly 20 being mostly within the tire air space defined by the wheel rim 51 and the tire carcass 52.

The interior mechanism of the detector assembly 20 is described more specifically hereafter with reference to FIGS. 3, 4, and 5. It is readily seen in FIG. 2 however, that a straight rod or tube element, if projected inwardly from the detector assembly 20, that is toward the center of the wheel, will intercept, during wheel rotation, the position of the finger or striker 66 of the switch assembly 60, and will cause movement thereof.

The switch assembly 60, described more fully hereinafter with reference to FIGS. 11 and 12 includes a body or case 61 from which projects the striker 66 as adverted to above. The switch assembly is supported in place by a bracket strip 62, which is mounted in this embodiment securely to the backing plate 56. Small bolts 63 are typically used for such mounting. A wire 64 leads to the terminal post 65 of the switch assembly.

We now describe the structure and operational features of the detector assembly 20, whose mounting and relationship to the tire and wheel structure have been described above with reference to FIG. 2. FIGS. 3, 4, and 5 are sectional views of the detector assembly 20 in, respectively, non-signalling, high pressure signalling, and low pressure signalling positions.

Referring to FIG. 3, the assembly is secured in place in the hole 28 of the tire rim 51 by means of the hard or moderately hard rubber bushing 29. It has a groove as shown to snugly fit the rim-hole 28. Fitted through a central hole 27 in the bushing 29 is a metal tubular sleeve 30. The fit of the sleeve 30 in the bushing is quite tight to form a gas tight connection. If desired, secure retention can be assured by use of an appropriate adhesive.

It will be seen that the aforesaid sleeve 30 functions as a supporting structure or standard for the detector assembly as a whole. A first casing 12 is fastened to the sleeve at its inner end. It is generally in the form of a circular cross-sectioned metal cup, having a hole in the bottom to surround and connect with the inner end of the sleeve 30. Connection thereto is desirably by brazing or welding when the cup or casing is metal, as is the usual construction. A slight upwardly projecting rim 15 is provided to facilitate joinder of the casing 12 to the sleeve 30, so that a strong connection can be made. At least one air hole 14 is provided in the wall of the casing 12. The rim of the casing 12 is in the form of a crimped ring 13 resembling the chine of a steel drum. The ring 13 grips, around the entire periphery thereof, the edge of a flexible diaphragm 37 and a rim or lip 7 of a second casing 8.

Slidably positioned within the sleeve 30 is a hollow pin 31. It extends inwardly (in the non-signalling posture of the assembly as shown in FIG. 3) to a position approximately at the zone at which the first casing 12 is joined to the second casing 8. Ferrules or rings 33, 34 on the exterior of the hollow pin 31 are used to secure in place thereon two washers 35, 36 which grip between their inner surfaces the inner edge of the flexible diaphragm 37, whose outer edge as already noted is securely gripped by the action of the crimp ring 13. A pressure tight bellows 32 is provided around the hollow pin 31. One end of the bellows 32 is connected to the inner end of the sleeve 30, and the other end is connected to the outer wall of the hollow pin 31, adjacent the retaining ring 33. These connections are gas tight, and it is seen that thus air leakage from the tire would be prevented through the minute clearance between the hollow pin 31 and the interior bore of the sleeve 30. Similarly, it is seen that, by reason of said clearance, the pressure within the bellows 32 is always the outside air pressure.

The casing 12, the diaphragm 37, with the retaining washer 36, and the bellows 32 thus form a generally enclosed space to which tire air is admitted by the hole 14 in the wall of the casing 12. The tire pressure, being applied against the diaphragm 37 and the retaining washer 36, tends to move or retain the hollow pin 31 toward the interior of the tire 52, this movement being resisted by the spring 39 which is positioned in the interior of the second casing 8 and bears against the interior retaining washer 35. As is explained hereafter, the pressure within the space defined in part by the second casing 8 is always outside air pressure. The spring 39 is sized and of such strength that, when the tire is inflated at the desired operating pressure, the hollow pin is positioned, as in FIG. 3, so that it does not appreciably protrude beyond the outer end of the sleeve 30.

The bottom of the second casing 8 is provided with a centrally positioned hole 9 through which passes the solid pin 21. The inner extremity of the solid pin 21 is fastened to a round pressure plate or disc 22. A second collapsible bellows 23 is attached at one end to the margin of said disc 22 and at its other end to the exterior of the second casing 8. It is seen that the space defined by the disc 22, the bellows 23, and the second casing, and the diaphragm 37 with its retaining washer 35 is sealed apart from the tire pressure. It is, however, open to atmospheric air ingress or egress by the minute clearance between the solid pin 21 and the bore of the hollow pin 31. The tire air pressure exerts a force on the disc 22 tending to collapse the second bellows 23 and consequently to project or move the solid pin 21 through the bore of the hollow pin 21 so that it would project through the tire rim beyond the extremity of the sleeve 30. Such movement is resisted by a spring 24, bearing against the inner surface of the pressure disc 22. The spring 24 is sized and of such strength that when the tire is at the desired working pressure, the spring force is sufficient to prevent its further compression and the solid pin 21 does not protrude to signalling position.

The posture or attitude of the detector assembly in FIG. 3 is that accompanying normal or standard tire pressure, as already explained. In this condition, neither the hollow pin 31 nor the solid pin 21 protrude past the sleeve 30. Accordingly, in the rotation of the wheel 53 neither of these members will strike the finger 66 of the switch assembly 60.

The functioning of the detector assembly in response to pressure deviation will be understood at least in part from the description already given but is further described and clarified by FIGS. 4 and 5. These show the condition of the parts of the detector assembly 20 when it is responding to a higher than desired tire pressure (FIG. 4), or a sub-normal pressure (FIG. 5).

Referring to FIG. 4, in this case the tire pressure is supra-normal. Such pressure on the plate 22 thus collapses the bellows 23 against the thrust of the spring 24. Attendant with this position is the movement of the solid pin 21 outward through the bore of the hollow pin 31, so that it will intercept, contact, and deflect, once in each wheel revolution, the striker arm 66 of the switch assembly 60.

It will be seen that the higher tire pressure, as it is also applied against the bottom of the diaphragm 37 and the retaining washer 36, would tend to cause further elongation of the first bellows 32. This movement is resisted by the compression of the spring 39. In addition, the bellows 32 is customarily designed to permit extension only to approximately the length indicated. To the extent that further elongation of the bellows 32 does occur, the attendant movement of the hollow pin 31 will be merely a minor further retraction toward the interior of the tire 52. The vertical disposition of the diaphragm 37 and its retaining washers in any case will have no effect whatsoever on the functioning of the high pressure responsive segments of the detector assembly, as the pressure applied within the second bellows 23 and to the underside of the pressure disc 22 will always be atmospheric pressure.

The relative disposition of the parts of the detector, when functioning as a low pressure deviation detector, is shown in FIG. 5. The drop in gas pressure results in a lower force acting on the diaphragm 37 and its retaining disc assembly 36, 35 against the spring 39. Consequently, the spring 39 is extended, moving the major part of the diaphragm 37 and the retaining washers or disc assembly 35,56 toward the tire rim 51. Accompanying such movement is a contraction of the first bellows 32, and movement of the hollow pin 31 to the extended position shown, so that it intercepts during a wheel rotation, the striker 66 of the switch assembly.

It will be clear from the foregoing how the detector achieves a signal position indicative of either high or low pressure deviations in the pressure of a tire in service. The transmittal of such signals by appropriate means for perception by a vehicle operator is of course an important aspect in using the detector. The switch assembly 60, for establishing an electrical signalling circuit, is a highly important element in such perception means, and is illustrated by FIGS. 11, 12 and is now described.

Figure 11:
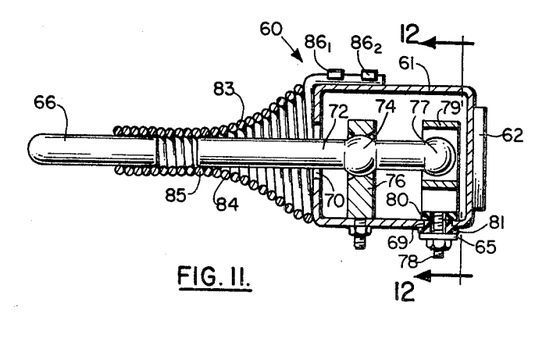
Figure 12:
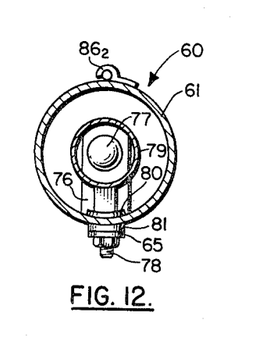

FIG. 11 is a sectional view of the switch mechanism of the switch assembly 60. FIG. 12 is a transverse section view on the line 12 — 12. As previously mentioned, the device is supported in the operating position by a bracket strip 62 attached to the casing 61. Mounted within the casing 61 is a pivot ring 76. This serves as bearing support for a switch arm 72 and permits pivoting movement in any direction within limits. The switch arm 72 is a straight metal piece having a rounded segment 74 which is fitted in the pivot ring 76. The internal end of the switch arm 72 is in the form of a slight enlargement or contact ball 77. A contact ring 79 is positioned in the casing 61 to encircle the contact ball 77. The ring 79 is secured in place by a mounting post 78, projecting through a hole 69 in the wall of the casing 61. A fiber washer 80 and a fiber bushing 81 insulates the contact ring 79 and its mounting post 78 from the casing 61.

The switch arm 72 projects through the casing 61 through the hole 70, and is tightly gripped in part of its external length by a small diameter portion 85 of a spring 83 which also has a conic section 84 which flares toward and sufficiently to encircle the end of the casing 61 by clips $86_1$, $86_2$. The cylindrical portion 85 of the spring 83 extends beyond the outer end of the switch arm 72, and after a short gap encircles a striker 66, which in turn projects beyond the spring extremity.

The above described switch structure provides several features of operation which are important to the objectives of providing a rugged mechanism for transmitting by electrical means, a pressure deviation signal to signalling means located at the operators position. It will be realized that the impact of a protruding pin against a striker arm 66 can be with varying degree of force. The violence of contact of course will depend on the speed of the vehicle at the time the pressure deviation occurs. It is therefore necessary that the switch assembly be responsive to both light and heavy contact. In addition, the switch must be capable of establishing the alarm circuit regardless of the direction of wheel rotation. Lastly, the switch construction should be such that it will function reliably regardless of minor misalignment in mounting. The above described switch structure accomplishes the foregoing objectives. It will be seen that a circuit will be made, as a result of the contact ball 77 contacting the interior of the contact ring 79, when the switch arm 72 is angularly displaced in any direction from the normal, non-contacting position of FIG. 11.

The striker pin 66, being connected to and normally aligned with the axis of the switch arm 72 by the spring 83, can be angularly displaced more than is possible for the switch arm. The angular displacement of the switch arm 72 is of course restricted by the dimensions of the contact ring 79. The flexiblity, that is, the greater degree of displacement permitted of the striker 66, removes a degree of criticality which otherwise would be encountered in operation of the switch.

When the apparatus is functioning to signal a tire pressure deviation contact will be made with the switch striker pin 66 once during every revolution of the wheel and tire. The frequency of course will depend on the speed at which the vehicle is moving. At speeds of about 30 miles per hour, the contacts will be as frequent as about 300 per minute, for the usual size wheel and tire. At such frequencies, the effect is essentially the establishment of a continuously closed alarm circuit, resulting in a continuous signal to the vehicle operator.

An alternative form of detector assembly is illustrated by FIGS. 6 – 10, inclusive.

Figure 6:
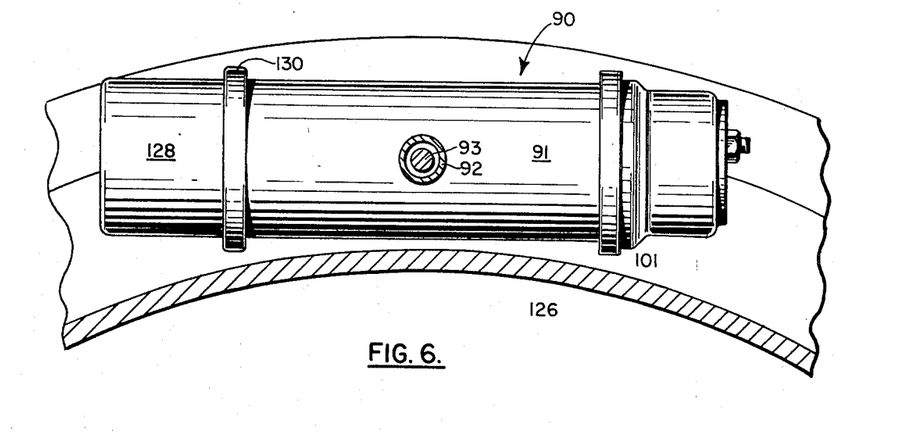
Figure 7:
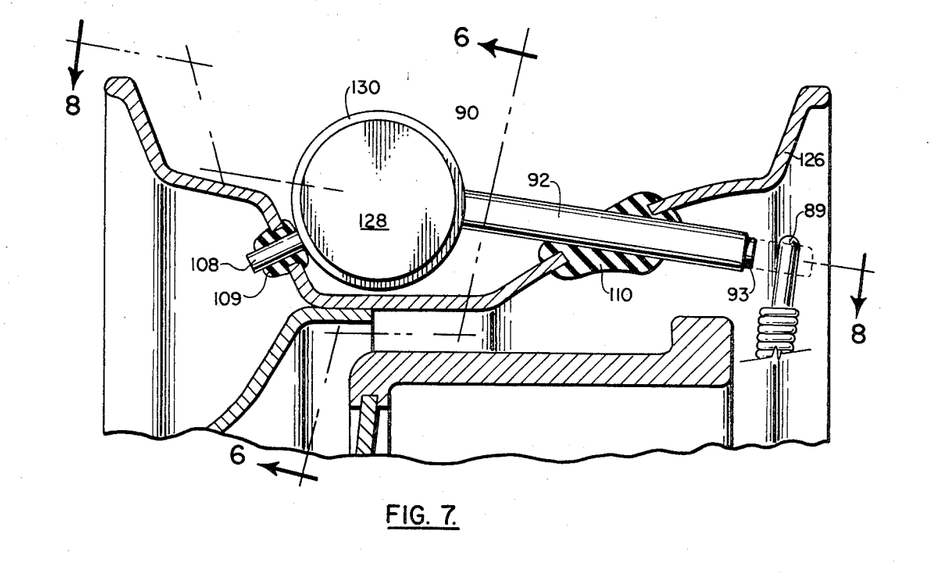
Figure 8:
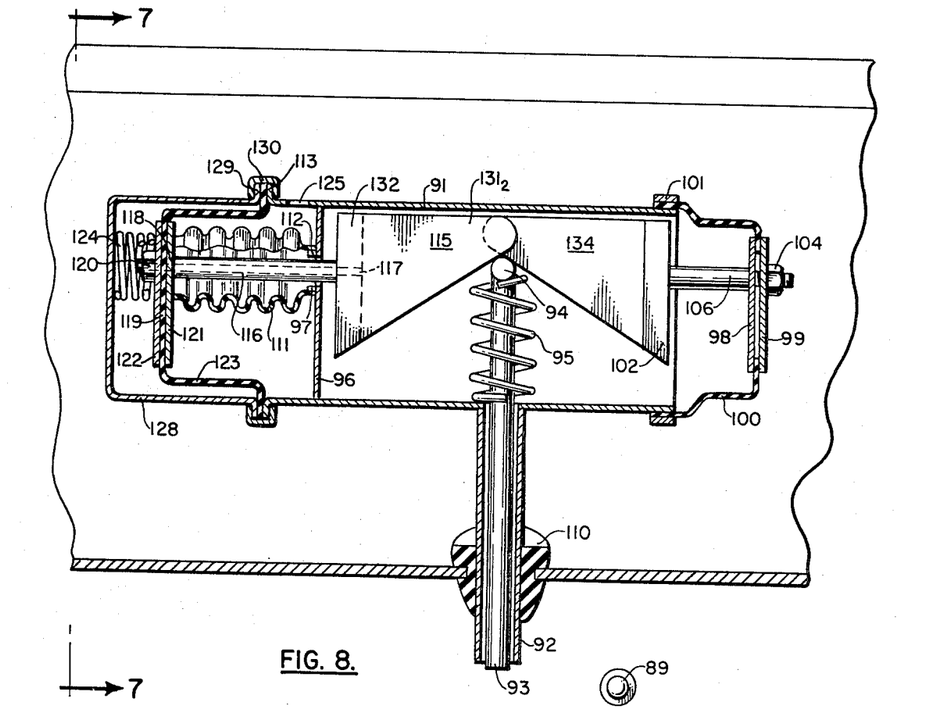
Figure 9:
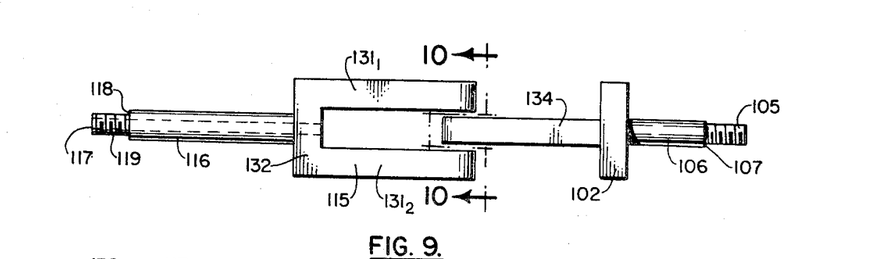
Figure 10:
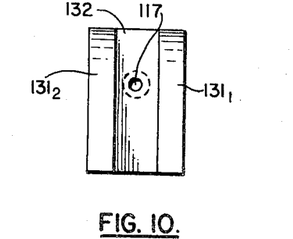

FIG. 6 is a sectional view at about the mid-plane of a segment of a tire and rim showing the positioning of the alternative detector assembly therein, FIG. 7 is a transverse section on the line 7—7 of the alternative detector assembly, FIG. 8 is a lateral sectional view of the detector assembly, and FIGS. 9, 10 illustrate construction of certain components.

A feature of this embodiment is that it provides a highly effective unit for installation wherein the clearances between the brake drum and the wheel rim are quite small. Another feature of the embodiment is its relatively small elevation into the space of a tire. Because of this feature, the unit, that is, the detector assembly is less likely to be damaged, if a tire is run flat or nearly flat, which could happen for example if a heavily loaded vehicle runs even a short distance with the tire at low pressure. These features appear in the cited figures.

FIG. 6 is an elevation of the detector assembly 90 in position on a wheel rim 126. The figure shows a portion of a wheel rim 126 in section, being a view along the line 6—6 (see FIG. 7). It is seen that the main body of the detector is a cylindrical shape or casing 91 tangentially positioned on the wheel rim 126 and thus within the air space defined by the tire not shown, and the wheel rim. Protruding from the side of the casing, at a more or less central position, is a tube 92. Slidably positioned in the tube 92 is a signalling rod or pin 93 (see also FIGS. 7 and 8). Upon the detector responding to a significant deviation from a standard pressure, either high or low, the signalling pin 93 intercepts a switch striker 89 and causes an alarm circuit to be made.

The detector is secured in place by two rubber bushings 110, 109. One bushing 110 is secured on the tube 92, and the second surrounds a pin 108 protruding from the wall of the casing 91. The pin 108 and the tube 92 are at the same lateral position on the assembly and are circumferentially oriented to permit easy installation on a wheel rim. Both rubber bushings 110, 109 are made with the external end area being smaller than the holes provided for their reception in the rim. Accordingly, the bushing can be readily snapped in place by pushing. In practice, the tube 92 and its bushing would be positioned first. Sufficient flexibility is provided by the bushing 110 so that perfect alignment would not be required for the bushing to be seated, that is, before the pin 108 and its bushing 109 are maneuvered into place in the position shown.

As the detector assembly is in the tire air space, it will be seen that the tire pressure will aid in maintaining an air tight seal. The tire pressure will in fact cause the rubber bushings 110, 109 to be more tightly secured in the respective holes in the rim.

The internal structure and operating mechanism of the detector is illustrated by FIG. 8, a sectional, longitudinal view along the line 8—8 (see FIG. 7). As already mentioned the pin 93 is caused to move outwardly through the tube 92 in response to pressure deviation. In its normal position, that is, reflecting an acceptable tire pressure, the pin 93 is coextensive with the outside end of the tube 92. Attached to the internal end of the pin 93 is a short cross pin 94 at right angles thereto. A spring 95 urges the pin 92 inwardly, so that the cross bar 94 bears against one or both of two wedges 102, 115.

The said wedges serve to translate longitudinal motion within the detector casing 91 into protrusion or retraction motion of the pin 93 when a pressure deviation occurs, or when normal pressure is restored, respectively. One wedge is designated as the high pressure wedge 102 and the other wedge is moved in response to, and is designated as the low pressure edge 115. The wedges 102, 115 are so designed, as is explained hereinafter, that they can independently function in their operation on the pin 93.

The high pressure wedge 102 has affixed thereto a shaft 106 projecting toward the end of the casing 91. It terminates with a threaded section 105 having a smaller diameter. A shoulder 107 supports a first retaining washer 98. Between this first retaining washer and a mating outside retaining washer 99 is gripped the inner edge of a generally tubular membrane or diaphragm 100 made of flexible, air impermeable material. Ring reinforcements not shown are usually provided to prevent this component from being deformed inwardly. Alternatively a bellows type structure can be substituted. The diaphragm 100 is received at its outside periphery by a clamping ring 101 around the outside of the end of the casing 91. A nut 104 is provided to clamp the two retaining washers 98, 99 on the inner edge of the diaphragm to make an air tight seal.

The low pressure wedge 115 has projecting from it a shaft 116, but (contrary to the shaft 106 projecting from the high pressure wedge 102) it is in the form of a tube. The bore 117 of the shaft continues through the back wall 132 of the low pressure wedge 115.

The shaft 116 passes loosely through a hole 112 in a partition wall 96 in the casing 91 and terminates in a threaded section 119 of smaller diameter. A shoulder 118 is provided to support an inner retaining washer 121. A matching exterior retaining washer 122 is also mounted on the threaded section 119. A fastening nut 120 is used to clamp the washers 121, 122 on the inner edge of a low pressure diaphragm 123, forming an air tight connection. The outer edge of the diaphragm 123 is fastened between a small flange 113 on the end of the casing 91 and a corresponding flange 129 on the cap section 128. A crimp ring 130 is provided to grip these portions together and provide a gas tight seal.

A flexible bellows 111 is provided around the shaft 116. It is secured at one end to a lip 97 around the margin of the hole 112 in the partition 96. At the other end, the bellows 111 is tightly fastened to the shaft 116.

It is seen that an air tight chamber is provided which is formed by the cap 128, the diaphragm 123 and the outer clamping washer 122. A spring 124 is compressed, in the normal position of FIG. 8, between the retaining washer pressure disc 122 and the interior of the cap 128.

The operation of the detector, in response to a high pressure deviation, is as follows: The tire pressure on the retaining washer 99 and the high pressure diaphragm 100 causes inward movement of the assembly, and of course of the high pressure wedge 102. This movement is against the force exerted by the spring 95 which is exerted against the inclined face of the wedge 102 by the cross bar 94. As the wedge 102 moves inwardly it therefore causes the pin 93 to be projected beyond the outer extremity of the tube 92. The pin intercepts and contacts, during a wheel rotation, the striker 89 of a switch assembly, causing an alarm circuit to be established as previously generally discussed.

The air pressure on the "downstream" side of the high pressure assembly—that is, the pressure against the inner retaining washer 99 and the inner surface of the diaphragm 100—is always atmospheric air pressure. This pressure is established by means of the minor clearance between the pin 93 and the interior bore of the tube 92.

When the excess tire pressure deviation is eliminated, and the normal tire pressure is restored, the force exerted by the spring 95, and the atmospheric air pressure, is sufficient to cause retraction of the pin 93 to the normal position of FIG. 8. Concurrently, the high pressure wedge 102, and of course the diaphragm 100 and retaining washers 98, 99 are caused to move outwardly to the position shown. It will be apparent that the spring 95 must be designed or selected to have sufficient strength to restore the high pressure segments to the indicated normal position for a predetermined pressure in the tire.

The functioning of the low pressure portions of the detector assembly follows the same general principles. The air pressure in the chamber formed by the cap section 128, the low pressure diaphragm 123 and the retaining washer 122 is always at atmospheric pressure, due to the bore 117, previously mentioned, through the shaft 116 of the low pressure wedge. This conduit communicates to the chamber containing the wedges 102, 115 which is maintained at atmospheric pressure by the clearance conduit past the signal pin 93 as already described.

A further chamber is formed by the "downstream" side of the diaphragm 123, the interior washer 121, the wall of the casing 91, the partition wall 96 and the collapsible bellows 111. An aperture 125 in the wall of the casing 91 provides access to the air in the tire. At normal pressures, as shown in FIG. 8, the tire pressure is sufficient to retain the low pressure wedge 115 in the retracted position shown. The tire pressure causes the compressed position of the spring 124 and the indicated elongation of the bellows 111.

When the tire air pressure drops below the desired level by a predetermined increment, the force of the spring 124 causes inward movement of the low pressure wedge 115, which in turn causes the signalling pin 93 to move outward to its signalling position. When tire pressure is restored, the reverse operations occur. Thus, the pressure of the tire applied against the washer 121 and the low pressure diaphragm 123, causes outward movement. Thus, the wedge 115 is retracted to the position shown and, similarly, the signalling pin 93 is retracted to the non-signalling position, so that it will not contact the striker 89 during a wheel revolution.

As previously indicated, the wedges 102 and 115 are specially designed for independent action. The details of this structure is clarified by FIGS. 10, 11. FIG. 10 being a plan of the two wedges in isolation, in the position occupied when the detector is responding to normal tire pressure, that is, not signalling a deviation. FIG. 11 is an end view of the low pressure wedge 115.

Referring to FIG. 9 it is seen that the wedge 115 has a central slot formed by two side pieces $131_1$, $131_2$ of corresponding shape. In contract, the high pressure wedge 102 has a tee shaped configuration, and includes a central portion or tongue 134, which is accommodated by the slot in the low pressure wedge 115. It is thus seen that the wedges 102, 115 can independently move longitudinally and cause the protrusion of the signal pin 93 in response to pressure deviations or restorations as already explained.

Various arrangements are eminently suitable for transmitting a signal, initiated by the detector of the present invention, to the operator's position. A schematic representation of a typical arrangement is given by FIG. 13, indicative of the system adapted to an automobile and a two wheeled trailer, thus providing for monitoring the tire pressures of six wheels. The figure comprises a plan indicative of the wheel positions including the front wheels $141_1$, $141_2$, the two rear wheels $142_1$, $142_2$ of the pulling vehicle and the wheels $143_1$, $143_2$ of the trailer.

Figure 13:
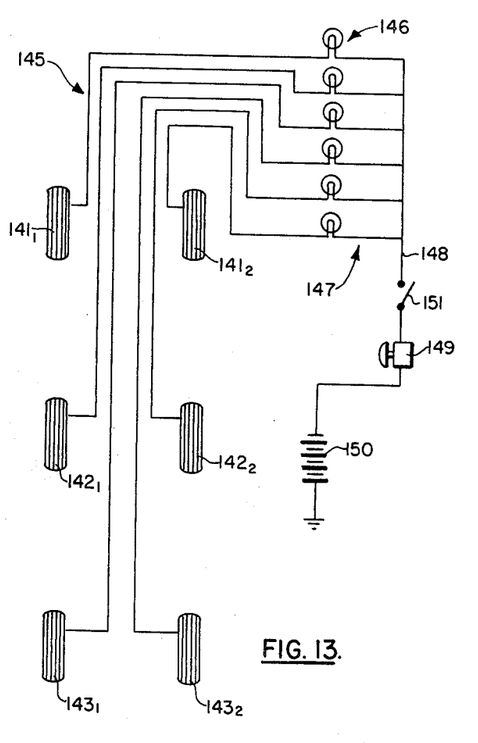

Located within each tire is a pressure deviation detector according to the description herein given, and also individually associated with each wheel is a switch as has been illustrated more specifically heretofore. From each switch runs a lead wire (corresponding to the wire 64 of FIG. 2), here collectively designated as 145. Each wire passes to a signal lamp, collectively identified as 146. The wires 147 from the lamp then pass to a junction wire 148 which passes to a signal buzzer or bell 149, which is connected to a terminal of the car battery 150. A switch 151 can be incorporated in the circuit, for deactivating the system as desired. Desirably, the switch is interlocked with the ignition system of the vehicle, so that the circuits can be energized only when the ignition is on, or the optional accessory circuit is made.

The signal lamps 146 can be positioned in any convenient fashion. Thus, it is desirable to use a dash board placement so as to readily attract the attention of the driver. As each of the lights is specifically correlated with one tire a signal will alert the driver to a pressure deviation for a particular tire. The vehicle can be promptly stopped when a signal occurs, and the normal pressure can be restored before proceeding. As the detectors of the present invention are entirely separate from the usual valves for inflating tires, no special provisions are required to enable air to be added to or bled from a tire exhibiting a pressure deviation. When normal pressure is restored, the detector withdraws the signalling pin from the signalling position and of course, further signalling will then not be transmitted to the driver's position.

Having described our invention and the preferred and best embodiments thereof, what we claim is:

1. Apparatus for detecting and signalling a deviation of tire pressure from a normal level, comprising a variable sized chamber adapted to be secured to a wheel and positioned in the tire air space, said chamber having a moveable wall exposed on one side to atmospheric air pressure and on the other side to tire air pressure when positioned within a tire, rod means operatively connected to said wall and capable of being projected to protrude through the wheel rim upon a decrease in size of said chamber by movement of the said wall, and spring means acting on the said wall to maintain it at a position such that the rod means does not protrude through the wheel rim when the tire pressure is at a normal value.

2. The detector apparatus of claim 1 further defined in that tire air pressure is applied to the inside of the moveable wall of a variable sized chamber and the spring means urges the wall to reduce the size of the chamber, whereby a drop in the tire pressure results in a reduction of the chamber size and protrusion of the rod means connected to the moveable wall.

3. The detector apparatus of claim 1 further defined in that tire air pressure is applied to the outside of the moveable wall of the variable size chamber and the spring means urges the wall to increase the size of the chamber, whereby an increase in the tire pressure results in a reduction of the chamber in size and protrusion of the rod means connected to the moveable wall.

4. Detector apparatus for securing on a wheel rim within a tire space for signalling deviation of tire pressure from a normal value by projecting a rod means through an aperture in a wheel rim upon occurrence of such deviation, said rod means being adapted to actuate a switch to make an electrical signal circuit, comprising a casing frame positioned within a tire and secured at an aperture in the wheel rim, said frame having an opening to admit tire air pressure to its interior;

a hollow pin adapted to move in part through said aperture, a first bellows surrounding the hollow pin, the first bellows being secured at one end generally adjacent the aperture and at the other and inner end to the hollow pin, a first pressure disc fastened around the inner end of the hollow pin, a flexible diaphragm fastened at its inner edge to the edge of the first pressure disc and at its outer edge to the edge of the frame, the frame, first bellows, first pressure disc and flexible diaphragm thereby forming a first variable sized chamber communicating with tire air pressure, a first spring bearing on the first pressure disc to cause movement thereof and of the hollow pin in part through the aperture, when the tire pressure is reduced;

a second pin slidably positioned within the hollow pin with sufficient clearance to permit air passage, having an inner portion extending beyond the end thereof, a second pressure disc attached to the inner end of the second pin, a cap surrounding a part of the inner portion, said cap having an edge secured adjacent the outer edge of the flexible diaphragm, and a hole through which passes the second pin, a second bellows fastened at one end to the edge of the second pressure disc and at the other end to the cap, the cap, second pressure disc, second bellows, flexible diaphragm and first pressure disc forming a second variable sized chamber communicating with external air pressure, a second spring within the second bellows bearing on the second pressure disc to resist movement until the tire pressure exceeds a normal value and causes reduction in size of the second variable sized chamber and movement of the second pressure disc and the second pin attached thereto to protrude in part through the aperture.

5. Apparatus for detecting and signalling deviations of tire pressure from normal value comprising a generally cylindrical casing, adapted to be secured tangentially to a wheel rim within the tire space, said casing having a partition adjacent one end, the other end being open, a tube projecting from the side of the casing and adapted to project through in sealed relation to an aperture in the rim, a rod slidably positioned in said tube with sufficient clearance to provide access of atmospheric air to the interior of the casing, a cross bar attached to the end of the rod within the casing and a spring positioned around the rod within the casing urging the rod inwardly, a high pressure wedge and a low pressure wedge slidably contained in the casing, each of said wedges having its wide end facing an end of the casing and the narrow end directed toward and normally engaging the cross bar, a rod extension from the wide end of the high pressure wedge connected to a first pressure disc, a first, tubular flexible membrane attached at one end to the margin of said disc and at the other end to the open end of the casing, a hollow rod extension from the wide end of the low pressure wedge, said rod passing through a hole in the partition in the casing and to and connected to a second pressure disc, a bellows surrounding the hollow rod extension and attached at one end to the rod and at the other end to the partition, a second tubular flexible membrane connected at one end to the edge of the second pressure disc and at the other end to the end of the casing, a gas tight cap surrounding the second pressure disc and, the second tubular flexible diaphragm, the said cap forming with the second pressure disc and second tubular membrane a variable volume chamber communicating to outside air pressure by the passage through the hollow rod extension, an aperture in the casing providing access to maintain tire pressure in the space defined by the second bellows, the partition, the second pressure disc and the second tubular, flexible membrane, and a spring positioned in the cap urging the second pressure disc against the force of the tire pressure on the pressure disc.

* * * * *